United States Patent
Koch et al.

(10) Patent No.: US 7,895,318 B2
(45) Date of Patent: *Feb. 22, 2011

(54) METHOD, DEVICE AND COMPUTER-READABLE STORAGE MEDIUM FOR NETWORK ADDRESS ASSOCIATION RECOVERY

(75) Inventors: Christopher D. Koch, Minneapolis, MN (US); Duane M. Butler, Anoka, MN (US); Steven G. Knight, St. Paul, MN (US); Bruce F. Naegele, Coon Rapids, MN (US)

(73) Assignee: Calix, Inc., Petaluma, CA (US)

( * ) Notice: Subject to any disclaimer, the term of this patent is extended or adjusted under 35 U.S.C. 154(b) by 445 days.

This patent is subject to a terminal disclaimer.

(21) Appl. No.: 11/957,992

(22) Filed: Dec. 17, 2007

(65) Prior Publication Data

US 2008/0101793 A1 May 1, 2008

Related U.S. Application Data (63) Continuation of application No. 10/691,166, filed on Oct. 22, 2003, now Pat. No. 7,318,096.

(60) Provisional application No. 60/421,206, filed on Oct. 24, 2002.

(51) Int. Cl.
*G06F 15/16* (2006.01)
*G06F 15/173* (2006.01)

(52) U.S. Cl. .................. 709/224; 709/223; 709/230; 709/242; 709/245

(58) Field of Classification Search .............. 709/220, 709/221, 224, 226, 229, 232, 238
See application file for complete search history.

(56) References Cited

U.S. PATENT DOCUMENTS

| | | | |
|---|---|---|---|
| 6,065,061 A | 5/2000 | Blahut et al. | |
| 6,172,974 B1 * | 1/2001 | Tseng et al. | 370/357 |
| 6,240,464 B1 | 5/2001 | Fijolek et al. | |
| 6,324,577 B1 | 11/2001 | Hirai | |
| 6,578,074 B1 | 6/2003 | Bahlmann | |
| 6,592,272 B1 * | 7/2003 | Masucci et al. | 398/47 |
| 6,751,221 B1 * | 6/2004 | Saito et al. | 370/392 |
| 6,874,106 B2 * | 3/2005 | Suzuyama et al. | 709/224 |
| 7,007,080 B2 | 2/2006 | Wilson | |

(Continued)

OTHER PUBLICATIONS

Croft, Bill and Gilmore, John, "Bootstrap Protocol (BOOTP)," Network Working Group, Sep. 1985.

(Continued)

*Primary Examiner*—Quang N. Nguyen
(74) *Attorney, Agent, or Firm*—Shumaker & Sieffert, P.A.

(57) ABSTRACT

Techniques for reestablishing network address associations upon recovery of a passive optical network (PON) disablement rely on storage address association information. A network node stores address association information in non-volatile memory upon detecting a network disablement. Upon recovery of the PON from the disablement, the network node associates network addresses to clients in accordance with the address association information. The network node may further verify the associations by sending ARP queries for the network addresses to the associated clients. Alternatively, the network nodes may reestablish the address associations by tracking the length of time of the network disablement, and updating address association information in accordance with the length of the disablement.

45 Claims, 6 Drawing Sheets

U.S. PATENT DOCUMENTS

| | | | |
|---|---|---|---|
| 7,124,197 | B2 | 10/2006 | Ocepek et al. |
| 2002/0016858 | A1 | 2/2002 | Sawada et al. |
| 2002/0021689 | A1* | 2/2002 | Robbins et al. ............. 370/352 |
| 2002/0062485 | A1 | 5/2002 | Okano et al. |
| 2002/0143968 | A1 | 10/2002 | Banerjee et al. |
| 2003/0045287 | A1* | 3/2003 | Taniguchi .................. 455/433 |
| 2003/0101243 | A1 | 5/2003 | Donahue et al. |
| 2003/0126262 | A1 | 7/2003 | Yoshida et al. |
| 2003/0177216 | A1 | 9/2003 | Sutherland et al. |
| 2003/0177238 | A1* | 9/2003 | Bush et al. ................. 709/226 |
| 2003/0177249 | A1 | 9/2003 | Takanashi et al. |
| 2003/0225864 | A1 | 12/2003 | Gardiner et al. |
| 2003/0233454 | A1* | 12/2003 | Alkhatib et al. ............ 709/226 |
| 2003/0236916 | A1* | 12/2003 | Adcox et al. ............... 709/245 |
| 2004/0090970 | A1 | 5/2004 | Sanchez et al. |

OTHER PUBLICATIONS

Alexander, S. and Droms R., "DHCP Options and BOOTP Vendor Extensions," Network Working Group, Mar. 1997.

Droms, R., "Dynamic Host Configuration Protocol," Network Working Group, Mar. 1997.

Wimer, W., "Clarifications and Extensions for the Bootstrap Protocol," Network Working Group, Oct. 1993.

Search Report for International Application No. PCT/US03/33403, mailed Jan. 26, 2005, 3 pgs.

Written Opinion for International Application No. PCT/US03/33403, mailed Apr. 28, 2005, 5 pgs.

Notification of Transmittal of International Preliminary Report on Patentability for PCT application No. PCT/US03/33403, mailed Oct. 14, 2005, 7 pages.

Response to Written Opinion for International Application No. PCT/US03/33403, filed Jun. 28, 2005, 7 pages.

* cited by examiner

| IP ADDRESS | MAC ADDRESS | LEASE TIME |
|---|---|---|
| 192.122.15.154 | 00-B0-D0-A6-8E-6D | 1500 |
| 192.122.15.129 | 00-01-02-5F-B0-42 | 400 |
| 192.122.15.30 | 00-CD-H3-55-04-BB | 800 |
| 191.122.15.240 | 00-09-C4-06-B8-2F | 1200 |

METHOD, DEVICE AND COMPUTER-READABLE STORAGE MEDIUM FOR NETWORK ADDRESS ASSOCIATION RECOVERY

This application is a continuation of U.S. application Ser. No. 10/691,166, filed Oct. 22, 2003, now U.S. Pat. No. 7,318, 096, issued Jan. 8, 2008, which claims the benefit of U.S. provisional application No. 60/421,206, filed Oct. 24, 2002, the entire content of each of which is incorporated herein by reference.

TECHNICAL FIELD

The invention relates to computer networking and, more particularly, to network address associations within a passive optical network (PON).

BACKGROUND

A passive optical network (PON) can deliver voice, video and other data among multiple network nodes using a common optical fiber link. Passive optical splitters and combiners enable a number of network nodes to share the optical fiber link. Each network node terminates the optical fiber link for a residential or business subscriber, and is sometimes referred to as a subscriber premises node. A PON typically includes a PON interface having multiple, independent PON interface modules that serve multiple optical fiber links. In the case of data services, the PON interface receives data packets from an Internet service provider for transmission to network nodes. A PON interface module provides an Ethernet interface for transmission and reception of data over a particular optical fiber link that serves a group of network nodes.

Dynamic Host Configuration Protocol (DHCP), or other similar protocols, can be used to assign Internet Protocol (IP) addresses to clients represented by network nodes within a PON. For example, a network node may associate a DHCP-assigned IP address with a client represented by the node. The association of an IP address with a client exists for the duration of a lease time defined by a DHCP server, or until the client releases the IP address. In the event the PON is temporarily disabled, however, the IP address association recognized by the DHCP client and DHCP server may inadvertently be lost. In this case, the disablement may require manual intervention to reacquire the IP addresses and reestablish the association for the DHCP server and client.

SUMMARY

In general, the invention is directed to recovery of address associations within a passive optical network (PON) following a network disablement. Upon detection of a network disablement, one or more network nodes within the PON store address association information in non-volatile memory. Address association information may include leased network addresses, media access control (MAC) addresses of the clients that leased each of the network addresses, and a remaining lease time for each network address. The network nodes may also store other address association information such as a subnet mask associated with the client, and a network address for a DHCP server that assigned the IP address.

Upon PON recovery, the PON reestablishes the association of network addresses to clients. For example, the network nodes may retrieve the address association information from non-volatile memory. Based on the address association information, the network nodes reacquire the IP addresses and reestablish the association of network addresses to clients. During the network disablement, however, one or more of the address associations may have ended. For instance, the lease time for an address may have expired during the network disablement.

For this reason, the network nodes may be configured to verify whether the address associations are still valid prior to reestablishing the associations. For example, a network node may be configured to send an Address Resolution Protocol (ARP) query for an IP address to an associated client. The network node may send the ARP query to the associated client periodically for the extent of any remaining lease time indicated in the address association information.

An ARP response from the respective client demonstrates that the address association still exists, and indicates that the network node may maintain the designated address association for the client. Thus, the network node may be capable of verifying associations, and maintaining the associations when an ARP response is received. The PON may maintain the association of network addresses to clients until an ARP response is not received from the client, or the remaining lease time expires. Network nodes may further modify the association upon detecting a DHCP renewal response, detecting a new DHCP acknowledgement with the IP address from the DHCP server, or detecting a DHCP release by the client.

Alternatively, the network nodes may reestablish the address associations using a clock or other timing device. For example, network nodes may determine the length of time of the network disablement, and incorporate a timestamp in the address association information stored in non-volatile memory to indicate the length of time. Upon PON recovery from the disablement, the network nodes may retrieve the address association information, and compare the timestamp with a time indicated by the timing device to determine the length of time of the disablement.

In this manner, network nodes may be capable of determining a relative time for the network disablement, and thereby updating the remaining lease time in the address association information. For example, network nodes may reduce the remaining lease times indicated in the address association information by the length of time of the disablement, and reestablish the associations of network addresses to clients in accordance with the updated address association information.

In one embodiment, the invention provides a method comprising detecting a disablement of a passive optical network. The method further comprises storing address association information indicating association of network addresses with network clients upon detecting the network disablement, and associating the network addresses and the network clients based on the address association information upon recovery from the network disablement.

In another embodiment, the invention provides a method comprising retrieving stored address association information indicating association of network addresses with network clients upon recovery of a passive optical network from a network disablement. The method further comprises associating the network addresses to the clients based on the address association information. The method also includes sending ARP queries for the network addresses indicated in the address association information, and maintaining the associations indicated in the address association information upon receiving ARP responses for the network addresses.

In an added embodiment, the invention provides a method comprising retrieving stored address association information indicating association of network addresses with network clients upon recovery of a passive optical network from a network disablement. The method further includes determining a length of time of the disablement, and updating remaining lease times indicated by the address association information in accordance with the determined length of time of the network disablement. The method further includes associating the network addresses to the network clients in accordance with the updated address association information.

In a further embodiment, the invention provides a passive optical network comprising a network node that represents at least one client. The passive optical network further comprises an interface that transmits information to the network node via an optical fiber link. The network node stores a set of address association information that associates network addresses to the clients represented by the network node.

In other embodiments, the invention provides computer-readable media comprising instructions for performing the techniques described herein.

The invention may provide one or more advantages. For example, the techniques described herein permit recovery of associations between network addresses and clients following a PON disablement with little or no manual intervention. In this manner, the invention can significantly reduce system maintenance costs and downtime. In addition, in some embodiments, the techniques may promote cost efficiency by avoiding the use of time devices, such as a real-time clock.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
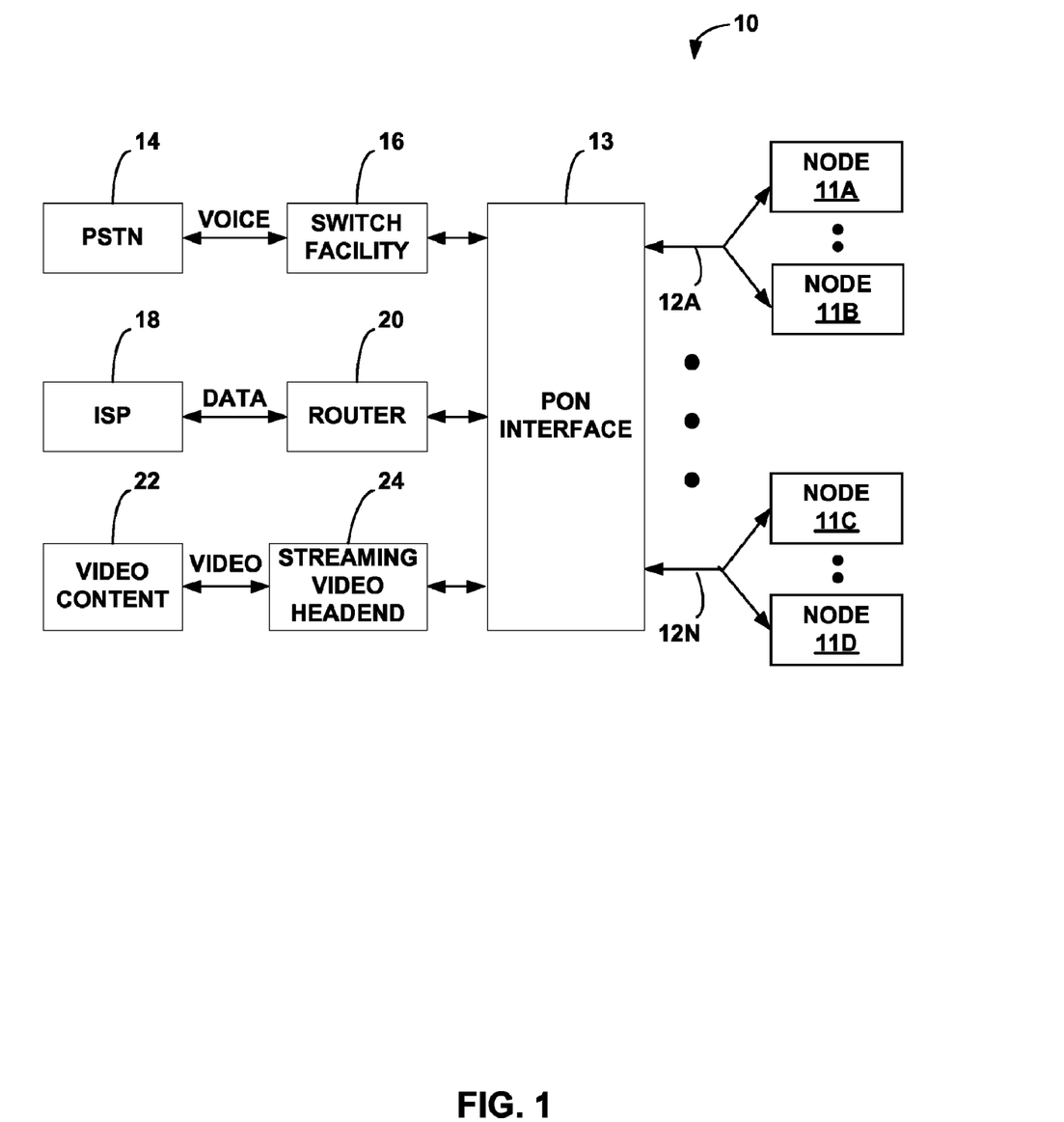
FIG. 1 is a block diagram illustrating a passive optical network (PON) arranged to deliver information to a number of network nodes via optical fiber links.

FIG. 1 is a block diagram illustrating a passive optical network (PON) 10. In accordance with the invention, PON 10 may be configured to implement techniques for recovery of address associations within the PON following a network disablement. PON 10 may be arranged to deliver voice, data and video content (generally "information") to a number of network nodes 11A-11D (collectively network nodes 11) via optical fiber links 12A-12N (collectively optical fiber links 12).

Exemplary components for implementing some of the features of PON 10 are commercially available from Optical Solutions, Inc., of Minneapolis, Minn., and designated by the trade name Fiberpath 400™, including the Fiberdrive™ headend bay interface and the Fiberpoint™ subscriber premise nodes. Other components may be added or modified as described herein to support techniques for recovery of address associations, in accordance with the invention.

As shown in FIG. 1, PON 10 includes a PON interface 13 that receives information from a source, and distributes the information along optical fiber links 12 to groups of network nodes 11. For example, PON interface 13 may receive voice information from the public switched telephone network (PSTN) 14 via a switch facility 16. In addition, PON interface 13 may be coupled to one or more Internet service providers (ISP's) 18 via a router 20 and the Internet.

As further shown in FIG. 1, PON interface 13 may receive video content 22 from video content suppliers via a streaming video headend 24. In each case, PON interface 13 distributes the information along optical fiber links 12 to groups of network nodes 11. A group of network nodes 11 may refer to nodes served by PON interface 13 and, more particularly, nodes served by a corresponding PON interface module within PON interface 13 via a common optical fiber link 12. A group of network nodes 11 may include a single network node 11, or numerous network nodes 11.

Network nodes 11, sometimes referred to as optical network terminators (ONTs) or optical network units (ONUs), may include hardware for receiving information from PON 10 via optical fiber links 12, and delivering the information to one or more client devices associated with a node 11. For example, each network node 11 may serve as a PON access point for one or more clients. Clients may include a variety of client devices such as computers, network appliances, televisions, set-top boxes, wireless devices, or the like.

Network nodes 11 also may include hardware for transmitting information from the associated client devices over PON 10. For example, a network node 11 may transmit voice information over PSTN 14 via PON interface 13 and switch facility 16 in the course of a telephone conversation. In addition, a network node 11 may transmit data to a variety of network nodes on the Internet via ISP 18, router 20 and PON interface 13. Multiple network nodes 11 typically transmit over a common optical fiber link 12 using time division multiplexing techniques.

In some embodiments, optical fiber link 12 may include a pair of optical fibers, forming an outgoing link and an incoming link. For example, the outgoing fiber optic link may transmit information from PON interface 13 to network nodes 11. The incoming fiber optic link may transmit information from network nodes 11 to PON interface 13.

PON interface 13 may be located near or far from a group of network nodes 11. In some existing networks, however, PON interface 13 may reside in a central office situated within approximately ten miles from each network node 11. A network node 11 may be located at any of a variety of locations, including residential or business sites. In addition, a single network node 11 may operate on a shared basis to deliver information to clients within two or more closely located residences or businesses via copper cabling, wireless communication, or additional optical fiber connections, either directly or via a network hub, router or switch.

PON 10 may lease network addresses, such as Internet Protocol (IP) addresses, to clients represented on network nodes 11. Furthermore, network nodes 11 may associate the leased network addresses with clients that requested the network addresses. For example, PON 10 may rely on one or more Dynamic Host Configuration Protocol (DHCP) servers (not shown in FIG. 1) to assign IP addresses to DHCP clients. The association of IP addresses to clients exists for the duration of the lease time defined by the DHCP server, or until the client releases the IP address. In accordance with the invention, PON 10 may be configured to support techniques for recovery of network address associations following a temporary disablement of PON 10. The recovery techniques enable the clients to reacquire previously assigned IP addresses. In addition, the recovery techniques enable PON 10 to reestablish the association of IP addresses to corresponding nodes 11 with little or no manual intervention, reducing labor time and costs.

Upon detection of a network disablement, network nodes 11 store address association information in non-volatile memory. The address association information may indicate association of network addresses with network clients, and may include leased network addresses, MAC addresses of the clients that leased the network addresses, and the remaining lease time applicable to each network address. Network nodes 11 may also store other address association information such as a subnet mask associated with the client, and a network address for a DHCP server that assigned the IP address. Alternatively, PON interface 13 or some other network component within PON 10 may store the address association information. The non-volatile memory that stores the association information may include Read-Only Memory (ROM), Programmable Read-Only Memory (PROM), Erasable Programmable Read-Only Memory (EPROM), Electrically Erasable Programmable Read-Only Memory (EEPROM), FLASH, Non-Volatile Random Access Memory (NVSRAM), and Ferroelectric Random Access Memory (FeRAM), and the like.

Upon recovering from the network disablement, PON 10 reestablishes the association of network addresses to clients. For example, network nodes 11 may retrieve the address association information from the non-volatile memory upon detecting that PON 10 has recovered from the disablement. In accordance with the address association information, network nodes 11 may associate network addresses to clients 36.

During the network disablement, however, one or more of the address associations may have ended. For instance, a lease time for a leased IP address may have expired. For this reason, network nodes 11 may be configured to not only recover information about network address associations, but also verify whether the address associations are still valid. For example, a network node 11 may send an ARP query for a recovered IP address to an associated client 36. Network node 11 may send the ARP query to the associated client 36 periodically for the extent of a remaining lease time indicated in the address association information.

An ARP response from respective client 36 demonstrates that the address association still exists. In particular, the client 36 recognizes the address identified by the ARP query and responds accordingly. Therefore, on the basis of the ARP response, network node 11 may maintain the address association of the IP address to client 36. In this case, it is determined that the address associated is still valid, and that the pertinent lease time has not expired.

Network node 11 may verify each association, and maintain the associations in which an ARP response was received, for all clients attached to the network node, or at least those clients for which association information has been stored. PON 10 maintains the association of network addresses to clients unless an ARP response is not received from the client, or the remaining lease time expires. Network nodes 11 may further modify the association upon detecting a DHCP renewal response from a DHCP server, detecting a new DHCP acknowledgement with the IP address from the DHCP server, or detecting that the client has released the leased address per the protocol.

Figure 2:
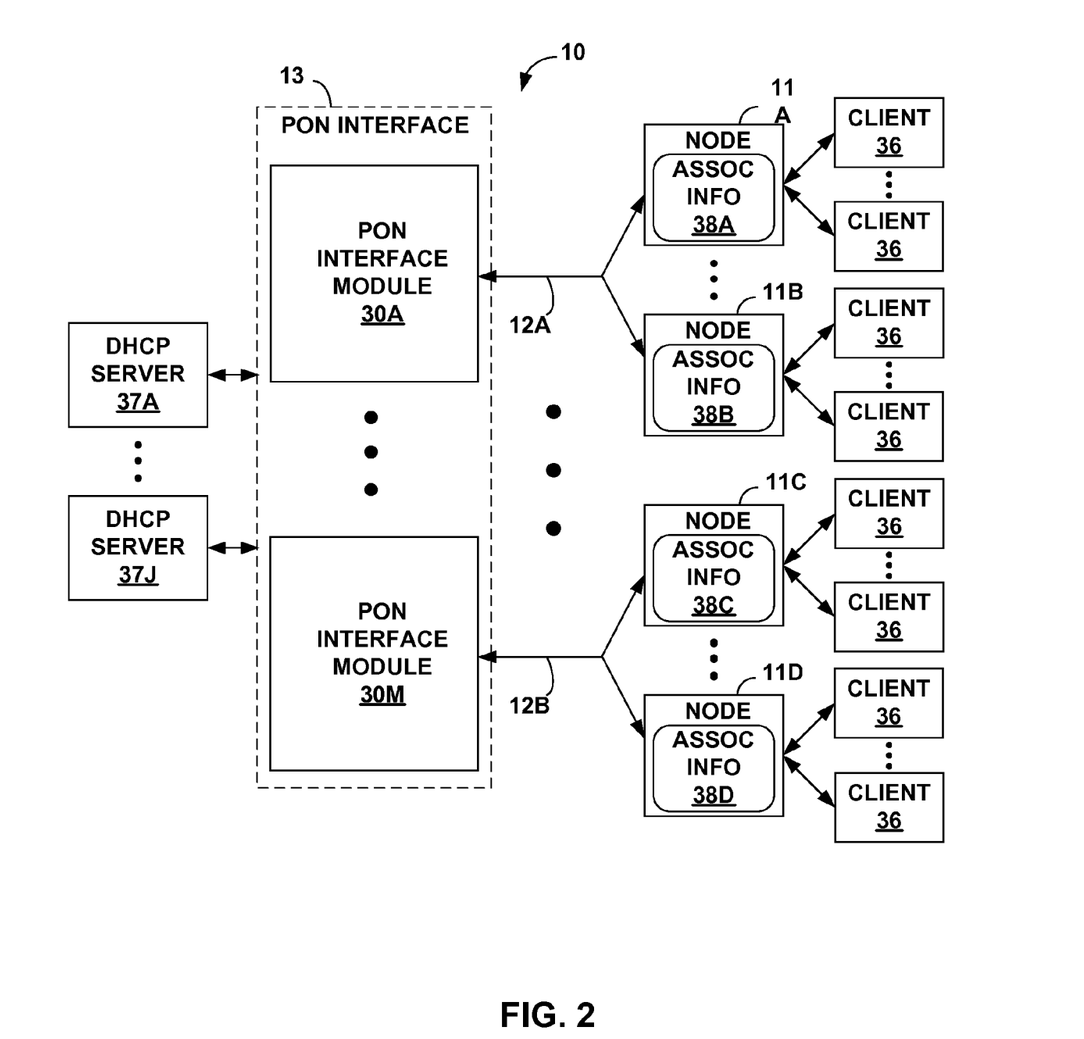
FIG. 2 is a block diagram illustrating a PON with multiple clients coupled to network nodes.

FIG. 2 is a block diagram illustrating a PON 10 with multiple clients 36 coupled to each of network nodes 11. PON 10 includes PON interface modules 30A-30M (collectively interface modules 30) within PON interface 13. Each PON interface module 30, sometimes referred to as a line card, is coupled to a group of network nodes 11 via a fiber link 12. PON interface 13 may include multiple PON interface modules 30, e.g. arranged in a common chassis. Each PON interface module 30 may form an independent Ethernet interface that serves a group of network nodes 11 coupled to a common optical fiber link 12. Hence, PON interface module 30 and nodes 11 terminate opposite ends of optical fiber links 12.

Network nodes 11 may act as an interface between PON 10 and at least one client 36. For example, a network node 11 may act as an interface that allows information to transit from the optical fiber framework of PON 10 to an electrical metallic framework, such as a copper wire or coaxial cable client network. For instance, network node 11 may interface the two frameworks by performing an opto-electrical conversion on information from PON interface modules 30 to clients 36. Network nodes 11 may also act as an interface for information transmitted in the opposite direction, i.e. from an electrical metallic framework to an optical fiber framework.

Each of network nodes 11 may further be responsible for determining which information is destined for clients 36 represented on a particular network node 11. PON interface 13 may transmit information destined to all network nodes 11 on optical fibers 12, and network nodes 11 may retrieve only the information pertaining to clients 36 represented on network nodes 11, e.g., by identification of source-destination IP address information in headers carried by the transmitted packets.

PON 10 may use DHCP relay techniques, or other similar techniques, to provide IP addresses to clients 36 represented on network nodes 11. For example, when a client 36 requires an IP address, e.g. upon boot or lease expiration, client 36 transmits a DHCP request to a network node 11 representing the client. Network node 11 passes the DHCP request to the corresponding PON interface module 34. In response, the respective PON interface module 34 generates a DHCP proxy request on behalf of client 36 and transmits it to an appropriate one of DHCP servers 37A-37J (collectively DHCP servers 37). DHCP servers 37 may, for example, be maintained by an ISP that provides Internet service to various network nodes 11 in PON 10.

DHCP server 37 assigns an IP address to the requesting client 36, and forwards a DHCP acknowledgement with the IP address to requesting client 36 via PON 10. The assigned IP address typically will have a finite lease time. Upon assignment of the IP address, network node 11 representing client 36 may associate the leased IP address with the requesting client 26. For example, network node 11 may record association information (ASSOC INFO) 38, which may include leased IP addresses, the MAC addresses of the respective clients leasing the IP addresses, the remaining lease times of leases, subnet masks associated with the client, or the like. Further, network node 11 may update an ARP cache that maps leased IP addresses with the MAC addresses of the clients leasing the IP address. The ARP cache may be used for routing information to clients.

Upon a network disablement, such as loss of power or other failure, PON interface 13 may lose state information indicating the address association of network addresses to clients 36. In accordance with the invention, however, PON 10 supports recovery techniques that allow PON 10 to reestablish the association of assigned IP addresses to clients 36. Network nodes 11 may monitor PON 10 for network disablements. For example, network nodes 11 may send periodic messages to PON interface 13 to communicate the state of PON interface 13. These periodic messages are sometimes referred to as "keepalives" or "hellos." When a network node 11 does not receive a response message from PON interface 13 within an allotted time frame, network node 11 may conclude that a network disablement has occurred. Upon detection of a network disablement, network nodes 11 store association information 38 in non-volatile memory for retrieval when PON interface 13 recovers.

Network nodes 11 may reestablish the address associations upon recovering from the network disablement. In one embodiment, network nodes 11 retrieve address association information 38 from the non-volatile memory upon PON 10 recovering from the network disablement. In accordance with the address association information, network nodes 11 may associate network addresses to clients 36, and verify whether all of the address associations still exist. The recovered address association information 38 may include remaining lease time information such as the amount of lease time remaining for each leased IP address at the time of the network disablement.

Network nodes 11 periodically send ARP queries for the IP addresses to the associated clients 36 in order to verify the existence of the address association. Network nodes 11 may send the ARP queries periodically for the extent of the remaining lease time indicated in address association information 38. For instance, address association information 38 may associate an assigned IP address with a particular client 36. Network node 11 may periodically send an ARP query for the IP address to the particular client 36 for the duration of the remaining lease time to verify that the client has not already released the address, e.g., by voluntarily releasing and renewing.

Network nodes 11 receive ARP responses from clients 36. The ARP responses demonstrate that the address associations are still present, and network nodes 11 maintain the associations of IP addresses to the clients 36 from which an ARP response is received. Network nodes 11 may update an ARP cache (not shown in FIG. 2) that maps assigned IP addresses to MAC addresses for clients 36 using information from address association information 38. Network nodes 11 may further communicate information regarding existing associations to PON interface 13. PON interface 13 may use the information to generate routing information. For example, PON interface 13 may associate IP addresses with corresponding network nodes 11, and associate IP addresses with corresponding PON interface modules 34. In this manner, PON 10 reestablishes the associations of IP address to clients, and may further associate IP addresses to routes through PON 10.

Network nodes 11 continue to send ARP queries for the IP addresses until an ARP response is not received, or the remaining lease time indicated by the association information expires. Network nodes may further cease ARP queries in response to detecting other DHCP messages that modify the associations, such as new DCHP acknowledgement, a DHCP renewal or a DHCP client release. For example, a network node 11 may detect a new DCHP acknowledgement with an IP address that is currently associated with a different client 36. In response to the new DHCP acknowledgment, network node 11 may modify the address association information to reflect the association change. More specifically, network node 11 may associate the leased IP address with a new client 36 for a new lease time, and cease ARP queries for the IP address.

If an ARP response is not received for a particular client 36, node 11 determines that the applicable network address association is no longer valid. In this case, if the client requires an IP address, the client 36 transmits a DHCP request to the node 11 representing the client. Network node 11 passes the DHCP request to the corresponding PON interface module 34, which generates a DHCP proxy request on behalf of the client 36 to obtain a new address from an appropriate DHCP server.

In another embodiment, a timing device may be provided to determine the length of a PON outage. For example, PON 10 may have access to a timing device, such as a real-time clock, to explicitly track the length of time of the disablement of PON 10. Network nodes 11 may determine the amount of time during which PON 10 was disabled. For example, network nodes 11 may set a timestamp in address association information 38 defining the time of the network disablement.

Upon PON 10 recovering from the disablement, network nodes 11 retrieve address association information 38. In this embodiment, network nodes 11 also may compare the timestamp recorded in address association information 38 with the time indicated by the timing device to determine the length of time of the disablement. Network nodes 11 may update address association information 38 to reflect the length of disablement.

More particularly, network nodes 11 may update the remaining lease time in address association information 38. For example, network nodes 11 may reduce the remaining lease times of address association information 38 by the length of time of the disablement. Network nodes 11 may reestablish the associations of network addresses to clients in accordance with the updated address association information 38.

When one or more of the network address leases expire during the network disablement, network nodes 11 may cancel the association maintained by address association information 38. Network nodes 11 may further communicate at least a portion of association information 38 to PON interface 13 for generating routing information.

Figure 3:
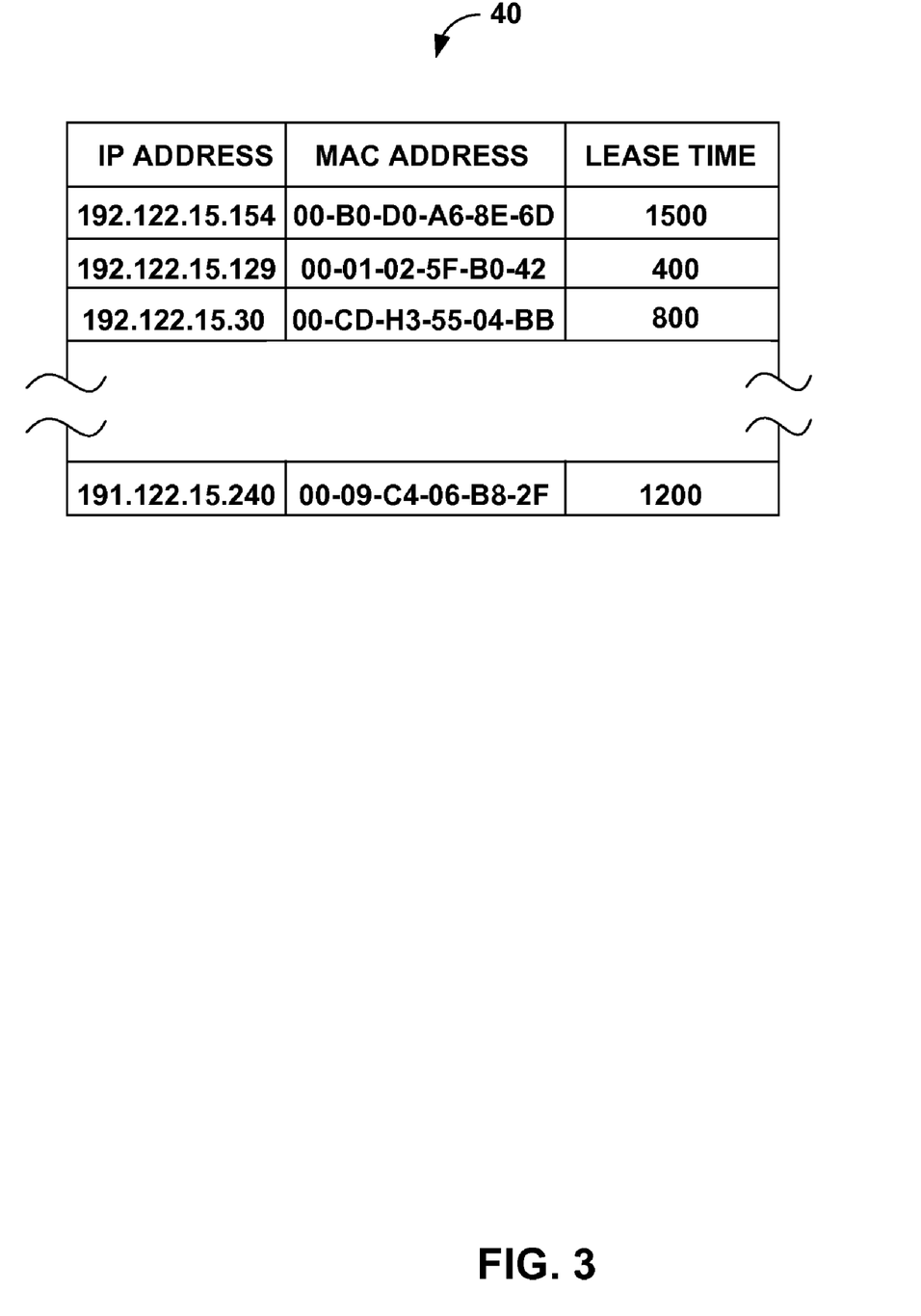
FIG. 3 is a block diagram illustrating an exemplary data structure for arrangement of address association information.

FIG. 3 is a block diagram illustrating an exemplary address association data structure 40 for one arrangement of address association information 38. In the example of FIG. 3, address association data structure 40 is a table in which each row represents an IP address association maintained by one of network nodes 11. The invention is in no way limited to the data structure depicted in FIG. 3. Rather, data structure 40 is provided for purposes of illustration.

As shown in FIG. 3, for each IP address association, address association data structure 40 may include a leased IP address, a MAC address corresponding to the client 36 leasing the IP address, and a lease time that indicates the remaining time, in seconds, of the IP address lease. In the example of FIG. 3, the IP addresses assigned to client 36 belong to the same IP subnet scope, i.e., the class C subnet 192.122.15.x. A first ISP may serve the Class C subnet of the assigned addresses. However, more than one ISP may assign network addresses to the clients 36 represented on a single node 11. In that case, the IP addresses of address association data structure 40 may be IP addresses from different IP subnets.

Upon detecting a network disablement, each of network nodes 11 stores data structures, similar to address association data structure 40 of FIG. 3, for the clients 36 represented by the network node. Network nodes 11 use the address association information 38 of address association data structures 40 to reestablish address associations upon recovery from the network disablement. Network node 11 may verify address associations by sending an ARP query for each of the leased IP addresses in address association data structure 40. For instance, network node 11 may send an ARP query for assigned IP address 128.15.122.129 periodically for 400 seconds. The ARP queries may be sent to client 36 corresponding to MAC address 00-01-02-5F-B0-42. The data of FIG. 3 is illustrated for exemplary purposes, and may be readily varied. For example, address association data structure 40 may further include a subnet mask associated with clients 36, a network address for a DHCP server 37 that assigned the IP address, or the like.

Figure 4:
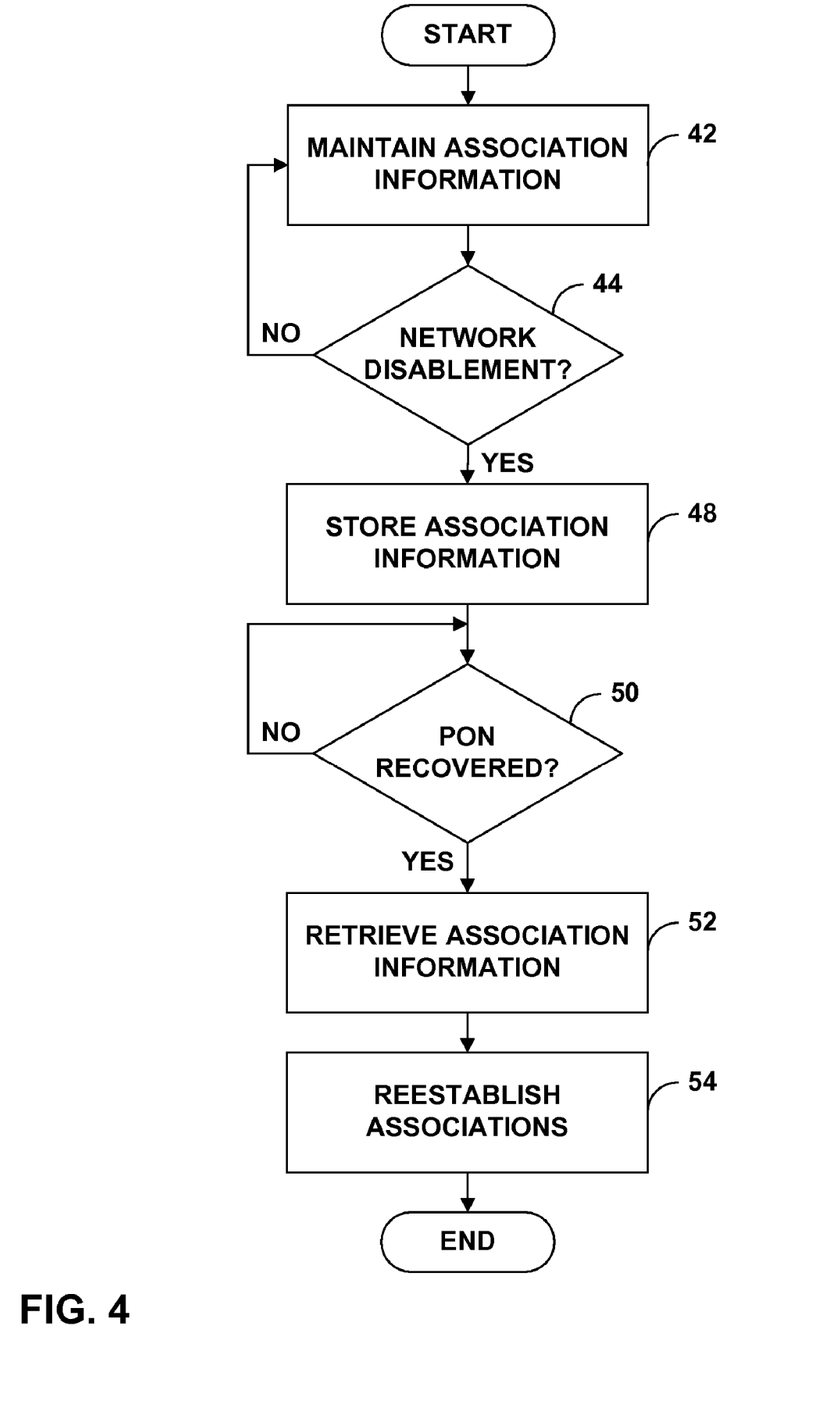
FIG. 4 is a flow diagram illustrating a technique for maintaining address associations.

FIG. 4 is a flow diagram illustrating a technique for maintaining address associations in accordance with an embodiment of the invention. As shown in FIG. 4, network nodes 11 maintain address association information 38 by monitoring DHCP communications between clients 36 and DHCP severs 37 (42). For example, a network node 11 may detect a DHCP acknowledgement from one of DHCP servers 37. The DHCP acknowledgement may include an assigned IP address and a lease time for the assigned IP address. The DHCP acknowledgement may further include a MAC address corresponding to client 36 requesting the IP address. The network node 11 that represents the requesting client 36 may add an entry in address association information 38 to associate the assigned IP address to the requesting client 36 for the defined lease time.

Network nodes 11 concurrently monitor for a network disablement (44). For example, network nodes 11 may send periodic messages, e.g. keepalive messages, to PON interface 13 to communicate the state of the network node devices. When a response to one of the periodic message is not received within an allotted time frame, network nodes 11 may conclude a network disablement has occurred. When no network disablement is detected, network nodes 11 continue to maintain accurate address association information 38.

When a network disablement is detected, network nodes 11 store the current address association information 38 in non-volatile memory (48) for later retrieval. Network nodes 11 monitor PON 10 to determine whether PON 10 has recovered from the network disablement (50), e.g., by listening for responses from PON interface 13 to keepalive messages that are periodically sent. Upon PON 10 recovering from the network disablement, network nodes 11 retrieve address association information 38 from the non-volatile memory, and reestablish the address associations in accordance with address association information 38 (52, 54).

Figure 5:
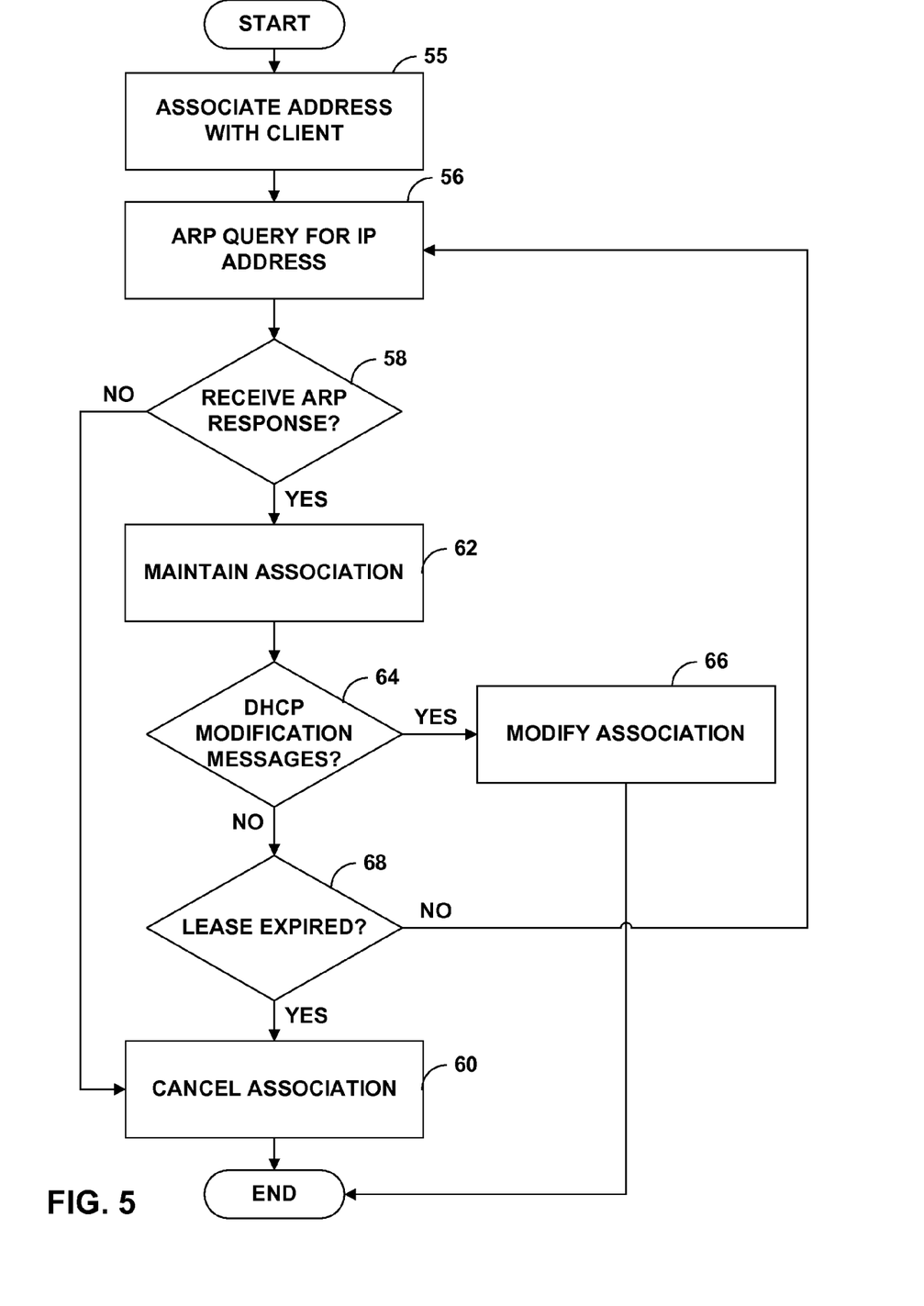
FIG. 5 is a flow diagram illustrating a technique for reestablishing address associations upon recovery of a PON from a network disablement.

FIG. 5 is a flow diagram illustrating a technique for reestablishing address associations upon recovery of a PON from a network disablement. Upon retrieving address association information 38, network node 11 may associate a network address to a client 36 in accordance with address association information 38 (55). To verify the existence of the association, network nodes 11 may send ARP queries for each of the IP addresses in address association information 38 (56). For example, for each assigned IP address association, network node 11 may periodically send an ARP query for the IP address for the remainder of a lease time. Network node 11 may send the ARP query to client 36 that corresponds with a MAC address in address association information 38. When an ARP response is not received from client 36 associated with the IP address, network node 11 cancels the association between the IP address and client 36 (58, 60).

When an ARP response is received from client 36 associated with the IP address, network node 11 maintains the association between the IP address and client 36 (62). Network node 11 determines whether any DHCP communications from client 36 or DHCP servers 37 modify address association information 38 (64). For example, network nodes 11 may look for DHCP acknowledgments, DHCP renewals, and DHCP address releases. When network node 11 detects a DHCP communication that modifies associations network node 11 modifies the association (66). Modifying the association may include canceling associations, associating a network address with a different one of clients 36, resetting a lease time for an address association, or other modification.

When network node 11 does not detect a DHCP communication that modifies network address associations, network node 11 checks whether a lease time of the association has expired (68). When the lease time of the network address association has expired, network nodes 11 cancel the association between the IP address and client 36 (60). When the lease time of the association has not expired, network nodes 11 continue to send ARP queries periodically for the IP address of the association.

Figure 6:
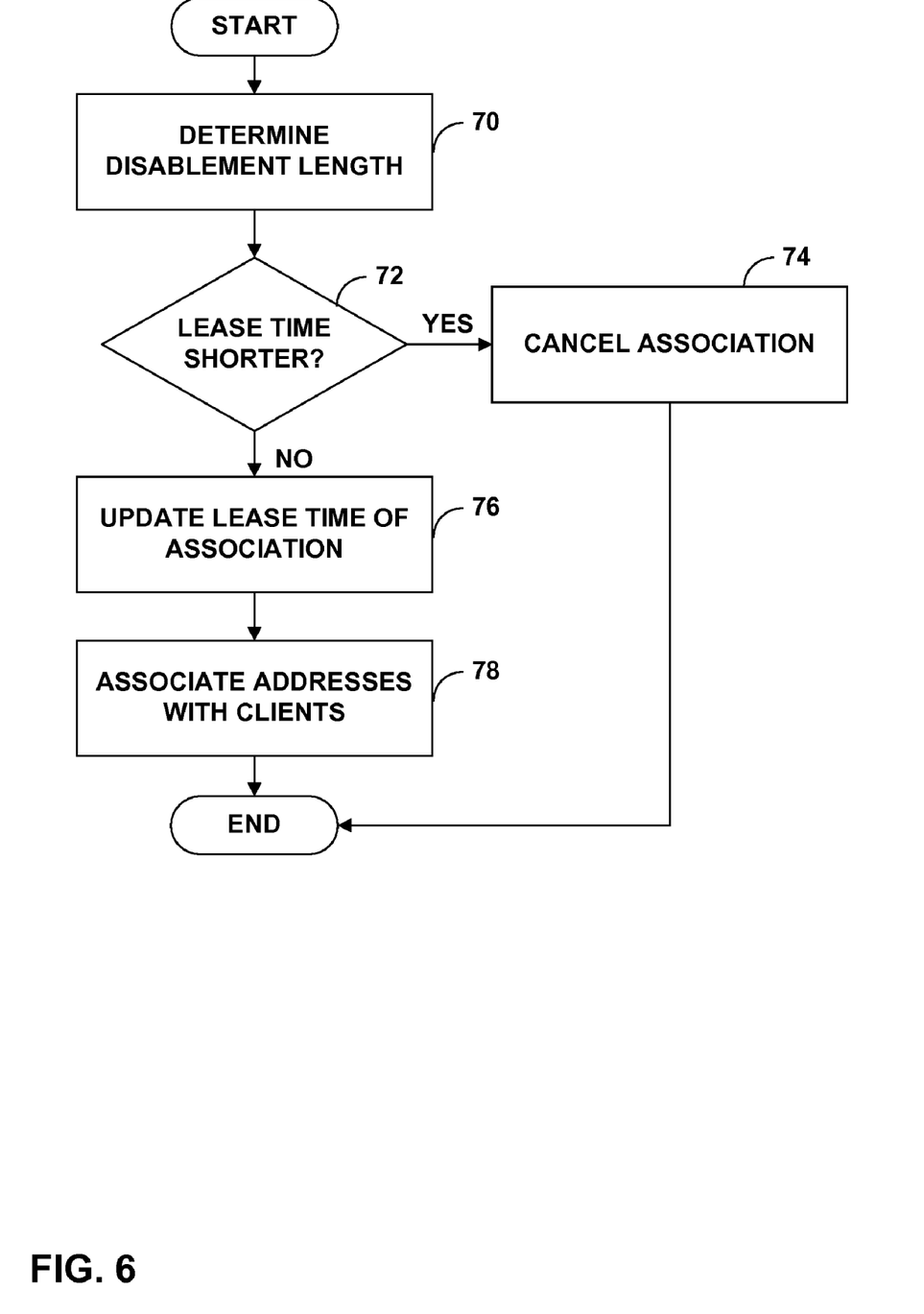
FIG. 6 is a flow diagram illustrating a technique for reestablishing address associations using a timing device upon recovery of a PON recovering from a network disablement.

FIG. 6 is a flow diagram illustrating a technique for reestablishing address associations using a timing device upon recovery of a PON from a network disablement. Upon retrieving address association information 38, network nodes 11 determine the length of time of the disablement of PON 10 (70). For example, network nodes 11 may compare a timestamp recorded in address association information 38 with a real-time clock to determine the length of time PON 10 was disabled. The real-time clock may be provided within each network node 11. In this case, the time indicated by the real-time clock may be locally retrieved by a network node. Alternatively, the real-time clock may be provided within a single network node 11 or within PON interface 13. In this case, the time indicated by the real-time clock may be communicated within messages transmitted on PON 10.

Network nodes 11 compare the disablement length with a remaining lease time of the association to determine whether the IP address lease expired during the network disablement (72). The lease time in address association information 38 indicates the amount of time left in the IP address lease at the beginning of the network disablement. Lease times that are shorter than the disablement length indicate leases that expired during the duration of the network disablement. When the lease time of the assigned IP address is shorter than the disablement length, network node 11 cancels the association between the IP address and client 36 (74).

When the lease time of the assigned IP address is not shorter than the disablement length, network node 11 updates the lease time for the assigned IP address (76). For example, network node 11 may subtract the disablement length from the lease time of the assigned IP address to obtain an adjusted lease time. Network node 11 may associate the IP address to client 36 in accordance with the adjusted lease time (78).

In various embodiments, the invention also is directed to a computer-readable medium comprising instructions to cause a processor to perform the techniques described herein. The instructions may be stored on a variety of computer-readable media including but not limited to ROM, EEPROM, RAM, Flash memory, magnetic or optical data storage disks or tapes, or similar media.

Various embodiments of the invention have been described. These and other embodiments are within the scope of the following claims.

The invention claimed is:

1. A method performed by a network node coupled to a network interface and to one or more network clients, the method comprising:

detecting a disablement of the network interface;

storing in a memory address association information indicating association of one or more network addresses with the one or more network clients upon detecting the disablement, wherein the memory comprises a memory associated with the network node coupled to the one or more network clients;

retrieving from the memory the stored address association information upon recovery of the network interface from the disablement; and reestablishing the association of the network addresses and the one or more network clients based on the retrieved address association information, wherein the disablement comprises a network disablement in which the network interface loses state information indicating association of the network addresses with the one or more network clients.

2. The method of claim 1, wherein reestablishing the association of the network addresses and the network clients comprises verifying whether the associations indicated by the address association information are valid.

3. The method of claim 2, wherein verifying whether the associations are valid comprises:

sending Address Resolution Protocol (ARP) queries for the network addresses indicated by the address association information; and maintaining the address associations upon receiving ARP responses.

4. The method of claim 3, further comprising canceling the address association for one of the network addresses when an ARP response is not received for the respective network address within a predetermined period of time.

5. The method of claim 3, wherein the address association information includes a remaining lease time, the method further comprising sending the ARP queries periodically for the remaining lease time for each of the address associations, and ceasing the sending of the ARP queries for one of the network addresses upon detecting a change in the address association information for the respective network address.

6. The method of claim 2, further comprising modifying the address association information upon detecting a lease of one of the network addresses or upon detecting a renewal of one of the network addresses, and canceling one of the address associations upon detecting that one of the clients has released the respective network address.

7. The method of claim 1, further comprising:

tracking a length of time of the network disablement; and updating remaining lease times of address association information in accordance with the length of time of the network disablement.

8. The method of claim 7, wherein tracking the length of time of the network disablement includes:

setting a timestamp upon detecting the network disablement; and comparing the timestamp with a time indicated by a timing device to determine the length of time of the network disablement, wherein updating remaining lease times includes subtracting the length of time of the network disablement from the remaining lease times.

9. The method of claim 7, further comprising canceling one of the associations when the remaining lease time for the respective association is shorter than the length of time of the network disablement.

10. The method of claim 1, wherein detecting a network disablement includes:

sending periodic messages to communicate a state of the network interface; and concluding that a network disablement has occurred when a response to the periodic messages is not received with a predetermined period of time.

11. The method of claim 1, wherein the address association information includes a network address and a remaining lease time, and wherein the network address includes an Internet Protocol (IP) address.

12. The method of claim 1, further comprising performing the storing, retrieving and reestablishing with substantially no manual intervention.

13. The method of claim 1, wherein the network interface is a passive optical network interface, and the network node is a passive optical network node coupled to the passive optical network interface by an optical fiber.

14. The method of claim 1, wherein the network node comprises an optical network terminator (ONT).

15. A network comprising:

a network node coupled to one or more network clients;

a network interface that transmits information to the network node, wherein the network node is coupled to the network interface and to the one or more clients; and a memory associated with the network node that stores a set of address association information that associates network addresses with the one or more network clients represented by the network node upon recovery of the network interface from a disablement, wherein the network node is configured to detect the disablement of the network interface, store in the memory the set of address association information upon detecting the disablement, retrieve from the memory the stored address association information upon recovery of the network interface from the disablement, and reestablish the association of the network addresses and the one or more network clients based on the retrieved address association information, wherein the disablement comprises a network disablement in which the network interface loses state information indicating association of the network addresses with the one or more network clients.

16. The network of claim 15, wherein the network node, to reestablish the association of the network addresses, is configured to verify whether the associations indicated by the address association information are valid.

17. The network of claim 16, wherein, to verify whether the associations are valid, the network node is configured to:

send Address Resolution Protocol (ARP) queries for the network addresses indicated by the address association information; and maintain the address associations upon receiving ARP responses.

18. The network of claim 17, wherein the network node cancels the address association for one of the network addresses when an ARP response is not received for the respective network address within a predetermined period of time.

19. The network of claim 17, wherein the address association information includes a remaining lease time, and the network node sends the ARP queries periodically for the remaining lease time for each of the address associations, and ceases the sending of the ARP queries for one of the network addresses upon detecting a change in the address association information for the respective network address.

20. The network of claim 16, wherein the network node modifies the address association information upon detecting a lease of one of the network addresses or upon detecting a renewal of one of the network addresses, and cancels one of the address associations upon detecting that one of the clients has released the respective network address.

21. The network of claim 15, wherein the network node tracks a length of time of the network disablement, and updates remaining lease times of address association information in accordance with the length of time of the network disablement.

22. The network of claim 21, wherein, to track the length of time of the network disablement, the network node:
   sets a timestamp upon detecting the network disablement; and
   compares the timestamp with a time indicated by a timing device to determine the length of time of the network disablement,
   wherein, to update remaining lease times, the network node subtracts the length of time of the network disablement from the remaining lease times.

23. The network of claim 21, wherein the network node cancels one of the associations when the remaining lease time for the respective association is shorter than the length of time of the network disablement.

24. The network of claim 15, wherein, to detect a network disablement, the network node:
   sends periodic messages to communicate a state of the network interface; and
   concludes that a network disablement has occurred when a response to the periodic messages is not received with a predetermined period of time.

25. The network of claim 15, wherein the address association information includes a network address and a remaining lease time, and wherein the network address includes an Internet Protocol (IP) address.

26. The network of claim 15, wherein the network node is configured to perform the retrieval and reestablishment with substantially no manual intervention.

27. The network of claim 15, wherein the network is a passive optical network, the network interface is a passive optical network interface, and the network node is a passive optical network node coupled to the passive optical network interface by an optical fiber.

28. The network of claim 15, wherein the network node comprises an optical network terminator (ONT).

29. ; A network device that represents one or more network clients, the network device comprising:
   a memory that stores a set of address association information that associates network addresses with the one or more network clients coupled to the network device,
   wherein the network device is configured to detect disablement of a network interface coupled to the network device, store in the memory the set of address association information upon detecting the disablement, retrieve from the memory the stored address association information upon recovery of the network interface from the disablement, and reestablish the association of the network addresses and the one or more network clients based on the retrieved address association information,
   wherein the disablement comprises a network disablement in which the network interface loses state information indicating association of the network addresses with the one or more network clients.

30. The network device of claim 29, wherein the network device, to reestablish the association of the network addresses, is configured to verify whether the associations indicated by the address association information are valid.

31. The network device of claim 30, wherein, to verify whether the associations are valid, the network device is configured to:
   send Address Resolution Protocol (ARP) queries for the network addresses indicated by the address association information; and
   maintain the address associations upon receiving ARP responses.

32. The network device of claim 31, wherein the network device cancels the address association for one of the network addresses when an ARP response is not received for the respective network address within a predetermined period of time.

33. The network device of claim 31, wherein the address association information includes a remaining lease time, and the network device sends the ARP queries periodically for the remaining lease time for each of the address associations, and ceases the sending of the ARP queries for one of the network addresses upon detecting a change in the address association information for the respective network address.

34. The network device of claim 30, wherein the network device modifies the address association information upon detecting a lease of one of the network addresses or upon detecting a renewal of one of the network addresses, and cancels one of the address associations upon detecting that one of the clients has released the respective network address.

35. The network device of claim 30, wherein the network device tracks a length of time of the network disablement, and updates remaining lease times of address association information in accordance with the length of time of the network disablement.

36. The network device of claim 35, wherein, to track the length of time of the network disablement, the network device:
   sets a timestamp upon detecting the network disablement; and
   compares the timestamp with a time indicated by a timing device to determine the length of time of the network disablement,
   wherein, to update remaining lease times, the network device subtracts the length of time of the network disablement from the remaining lease times.

37. The network device of claim 35, wherein the network device cancels one of the associations when the remaining lease time for the respective association is shorter than the length of time of the network disablement.

38. The network device of claim 29, wherein, to detect a network disablement, the network device:
   sends periodic messages to communicate a state of the network interface; and
   concludes that a network disablement has occurred when a response to the periodic messages is not received with a predetermined period of time.

39. The network device of claim 29, wherein the address association information includes a network address and a remaining lease time, and wherein the network address includes an Internet Protocol (IP) addresses.

40. The network device of claim 29, wherein the network device is configured to perform the retrieval and reestablishment with substantially no manual intervention.

41. The network device of claim 29, wherein the network is a passive optical network, the network interface is a passive optical network interface, and the network is a passive optical network device coupled to the passive optical network interface by an optical fiber.

42. The network device of claim 29, wherein the network device comprises an optical network terminator (ONT).

43. A non-transitory computer-readable storage medium comprising instructions to cause a processor, in a network node coupled to a network interface and to one or more network clients, to:

detect a disablement of the network interface;

store in a memory address association information indicating association of network addresses with the one or more network clients upon detecting the disablement, wherein the memory comprises a memory associated with the network node coupled to the one or more network clients;

retrieve from the memory the stored address association information upon recovery of the network interface from the disablement; and     reestablish the association of the network addresses and the one or more network clients based on the retrieved address association information,     wherein the disablement comprises a network disablement in which the network interface loses state information indicating association of the network addresses with the one or more network clients.

44. The computer-readable storage medium of claim 43, wherein the network node comprises an optical network terminator (ONT).

45. A network node coupled to a network interface and to one or more network clients, the network node comprising:

means for detecting a disablement of the network interface;

means for storing address association information indicating association of one or more network addresses with the one or more network clients upon detecting the disablement, wherein the means for storing is associated with the network node coupled to the one or more network clients;

means for retrieving from the means for storing the stored address association information upon recovery of the network interface from the disablement; and     means for reestablishing the association of the network addresses and the one or more network clients based on the retrieved address association information,     wherein the disablement comprises a network disablement in which the network interface loses state information indicating association of the network addresses with the one or more network clients.

\* \* \* \* \*